(12) United States Patent
Ebrom et al.

(10) Patent No.: US 8,682,733 B2
(45) Date of Patent: Mar. 25, 2014

(54) SYSTEM FOR PRODUCT DEMONSTRATION

(75) Inventors: Matthew P. Ebrom, Holland, MI (US);
Mark E. Glotzbach, Granger, IN (US);
Philip A. Molloy, Marion, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 948 days.

(21) Appl. No.: 11/617,797

(22) Filed: Dec. 29, 2006

(65) Prior Publication Data

US 2007/0298405 A1    Dec. 27, 2007

Related U.S. Application Data

(63) Continuation-in-part of application No. PCT/US2006/022420, filed on Jun. 8, 2006, and a continuation-in-part of application No. PCT/US2006/022503, filed on Jun. 9, 2006.

(51) Int. Cl.
*G06Q 30/00* (2012.01)

(52) U.S. Cl.
USPC ........... 705/26.1; 434/365; 434/379; 434/382

(58) Field of Classification Search
USPC ............ 705/26, 27, 26.1, 27.1; 434/118, 107, 434/365, 379, 382; 8/159; 60/908
See application file for complete search history.

(56) References Cited

U.S. PATENT DOCUMENTS

| | | | |
|---|---|---|---|
| 4,303,990 A | 12/1981 | Seipp | |
| 4,345,132 A | 8/1982 | Takase et al. | |
| 4,375,586 A | 3/1983 | Ueda | |
| 4,480,307 A | 10/1984 | Budde et al. | |
| 4,503,535 A | 3/1985 | Budde et al. | |
| 4,520,576 A | 6/1985 | Vander Molen | |
| 5,113,398 A | 5/1992 | Howes | |
| 5,321,229 A | 6/1994 | Holling et al. | |
| 5,408,382 A | 4/1995 | Schultz et al. | |
| 5,422,631 A * | 6/1995 | Gertz | 340/825.25 |
| 5,499,019 A * | 3/1996 | Burgan et al. | 340/4.31 |
| 5,520,576 A | 5/1996 | Wastell et al. | |
| 5,606,624 A * | 2/1997 | Damato | 381/332 |
| 5,609,786 A * | 3/1997 | An | 219/702 |

(Continued)

FOREIGN PATENT DOCUMENTS

| | | |
|---|---|---|
| DE | 4038801 | 6/1992 |
| DE | 19746423 | 4/1999 |

(Continued)

OTHER PUBLICATIONS

Pugh, C., and J. Tomlinson. "High Efficiency Washing Machine Demonstration, Bern, Kansas." Proceedings: American Water Works Association (1999).*

(Continued)

*Primary Examiner* — Matthew Zimmerman

(57) ABSTRACT

A product in the form of a household appliance has an internal communications network connecting two or more components, and software architecture implemented on the network that identifies the components, communicates the capabilities of each identified component, communicates the status of each identified component, provides a command interface for operating the components, and facilitates communication between the components and devices external to the product. An external smart device having demonstration software communicates with the internal communications network and is in control of at least one of the components to effect a demonstration of features of the product.

17 Claims, 14 Drawing Sheets

(56) References Cited

U.S. PATENT DOCUMENTS

| | | | |
|---|---|---|---|
| 5,710,409 A | 1/1998 | Schwarzbäcker et al. | |
| 5,745,798 A * | 4/1998 | Hirasawa | 396/51 |
| 5,754,548 A | 5/1998 | Hoekstra et al. | |
| 5,839,097 A | 11/1998 | Klausner | |
| 5,932,130 A | 8/1999 | Taino | |
| 6,041,346 A | 3/2000 | Chen et al. | |
| 6,042,278 A * | 3/2000 | Spencer et al. | 400/61 |
| 6,061,646 A * | 5/2000 | Martino et al. | 704/3 |
| 6,105,122 A | 8/2000 | Muller et al. | |
| 6,121,593 A | 9/2000 | Mansbery et al. | |
| 6,148,349 A | 11/2000 | Chow et al. | |
| 6,243,772 B1 | 6/2001 | Ghori et al. | |
| 6,295,272 B1 | 9/2001 | Feldman et al. | |
| 6,359,270 B1 * | 3/2002 | Bridson | 219/679 |
| 6,376,936 B1 * | 4/2002 | Thomas | 307/125 |
| 6,425,156 B1 * | 7/2002 | Knopp et al. | 8/159 |
| 6,426,947 B1 | 7/2002 | Banker et al. | |
| 6,453,687 B2 | 9/2002 | Sharood et al. | |
| 6,480,753 B1 * | 11/2002 | Calder et al. | 700/83 |
| 6,507,352 B1 * | 1/2003 | Cohen et al. | 715/817 |
| 6,536,658 B1 * | 3/2003 | Rantze | 235/375 |
| 6,539,501 B1 | 3/2003 | Edwards | |
| 6,539,570 B2 | 4/2003 | Youn et al. | |
| 6,559,882 B1 | 5/2003 | Kerchner | |
| 6,586,714 B2 * | 7/2003 | Kawamura et al. | 219/711 |
| 6,587,739 B1 | 7/2003 | Abrams et al. | |
| 6,668,339 B1 | 12/2003 | Maeda | |
| 6,681,248 B1 | 1/2004 | Sears et al. | |
| 6,711,632 B1 | 3/2004 | Chow et al. | |
| 6,717,522 B1 * | 4/2004 | Nagatomo et al. | 340/815.4 |
| 6,826,267 B2 * | 11/2004 | Daum et al. | 379/102.03 |
| 6,842,721 B2 * | 1/2005 | Kim et al. | 702/188 |
| 6,847,614 B2 | 1/2005 | Banker et al. | |
| 6,883,065 B1 | 4/2005 | Pittelkow et al. | |
| 6,919,815 B2 | 7/2005 | Peterson | |
| 6,934,592 B2 * | 8/2005 | Hood et al. | 700/83 |
| 6,948,098 B2 | 9/2005 | Pillay et al. | |
| 6,983,628 B2 | 1/2006 | Cho | |
| 6,990,464 B1 * | 1/2006 | Pirillo | 705/7.29 |
| 6,996,115 B1 | 2/2006 | Budde et al. | |
| 6,996,741 B1 | 2/2006 | Pittelkow et al. | |
| 7,003,688 B1 | 2/2006 | Pittelkow et al. | |
| 7,043,663 B1 | 5/2006 | Pittelkow et al. | |
| 7,060,006 B1 * | 6/2006 | Watterson et al. | 482/54 |
| 7,069,468 B1 | 6/2006 | Olson et al. | |
| 7,096,169 B2 * | 8/2006 | Crutchfield, Jr. | 703/7 |
| 7,111,242 B1 | 9/2006 | Grooters | |
| 7,114,101 B2 | 9/2006 | Kudo et al. | |
| 7,117,051 B2 | 10/2006 | Landry et al. | |
| 7,126,927 B2 | 10/2006 | Heijenk | |
| 7,127,633 B1 | 10/2006 | Olson et al. | |
| 7,134,011 B2 | 11/2006 | Fung | |
| 7,136,927 B2 | 11/2006 | Traversat et al. | |
| 7,165,107 B2 | 1/2007 | Pouyoul et al. | |
| 7,171,475 B2 | 1/2007 | Weisman et al. | |
| 7,248,381 B2 * | 7/2007 | Montierth et al. | 358/1.15 |
| 7,295,099 B2 | 11/2007 | Lee et al. | |
| 7,636,456 B2 * | 12/2009 | Collins et al. | 382/118 |
| 2001/0025349 A1 * | 9/2001 | Sharood et al. | 713/340 |
| 2001/0044751 A1 * | 11/2001 | Pugliese et al. | 705/26 |
| 2001/0049846 A1 * | 12/2001 | Guzzi et al. | 8/158 |
| 2002/0078511 A1 * | 6/2002 | Blair et al. | 8/159 |
| 2002/0116282 A1 * | 8/2002 | Martin et al. | 705/26 |
| 2002/0120502 A1 | 8/2002 | Sakaguchi | |
| 2002/0161552 A1 | 10/2002 | Ryu | |
| 2003/0001720 A1 * | 1/2003 | Wade et al. | 340/3.5 |
| 2003/0014259 A1 * | 1/2003 | Ferragut et al. | 704/272 |
| 2003/0036980 A1 * | 2/2003 | Wren | 705/27 |
| 2003/0051253 A1 * | 3/2003 | Barone, Jr. | 725/112 |
| 2004/0060932 A1 | 4/2004 | Chun | |
| 2004/0095370 A1 * | 5/2004 | Broker et al. | 345/705 |
| 2004/0156170 A1 | 8/2004 | Mager et al. | |
| 2005/0011886 A1 | 1/2005 | Kim | |
| 2005/0013310 A1 | 1/2005 | Banker et al. | |
| 2005/0018612 A1 | 1/2005 | Fitzgerald | |
| 2005/0103466 A1 | 5/2005 | Landry et al. | |
| 2005/0154496 A1 * | 7/2005 | Chapman et al. | 700/278 |
| 2005/0174777 A1 * | 8/2005 | Cooper et al. | 362/276 |
| 2005/0177463 A1 * | 8/2005 | Crutchfield et al. | 705/27 |
| 2005/0251604 A1 | 11/2005 | Gerig | |
| 2006/0092861 A1 | 5/2006 | Corday et al. | |
| 2006/0120302 A1 | 6/2006 | Poncini et al. | |
| 2006/0123124 A1 | 6/2006 | Weisman et al. | |
| 2006/0123125 A1 | 6/2006 | Weisman et al. | |
| 2006/0168159 A1 | 7/2006 | Weisman et al. | |
| 2006/0168269 A1 | 7/2006 | Sather et al. | |
| 2006/0184661 A1 | 8/2006 | Weisman et al. | |
| 2007/0129812 A1 | 6/2007 | Ferchau | |
| 2007/0129813 A1 | 6/2007 | Ferchau | |
| 2007/0160022 A1 | 7/2007 | McCoy et al. | |
| 2007/0240173 A1 | 10/2007 | McCoy et al. | |
| 2007/0288331 A1 | 12/2007 | Ebrom et al. | |
| 2007/0298405 A1 | 12/2007 | Ebrom et al. | |
| 2008/0065601 A1 * | 3/2008 | Korbonski | 707/3 |

FOREIGN PATENT DOCUMENTS

| | | |
|---|---|---|
| EP | 0802465 A2 | 10/1997 |
| EP | 1016831 A1 | 7/2000 |
| EP | 1028604 A2 | 8/2000 |
| EP | 1351447 A1 | 10/2003 |
| JP | 5814-8316 | 9/1983 |
| JP | 6313-561 | 11/1994 |
| JP | 2002-49381 A | 2/2002 |
| JP | 2002-074086 | 3/2002 |
| JP | 2004-333079 | 11/2004 |
| KR | 1020020007912 A | 1/2002 |
| WO | 2005109135 A1 | 11/2005 |
| WO | 2006014504 A2 | 2/2006 |
| WO | 2006135726 A2 | 12/2006 |
| WO | 2006135758 A1 | 12/2006 |

OTHER PUBLICATIONS

Pinkerton, Janet "At home in Silicon Valley: Networking is the thing" Dealerscope Sep. 2000. vol. 42n9. 32.

International Search Report from PCT/US2008/081992.

* cited by examiner

SYSTEM FOR PRODUCT DEMONSTRATION

CROSS-REFERENCE TO RELATED APPLICATION

This application is a continuation-in-part of International Patent Application No. PCT/US2006/022420, filed Jun. 8, 2006, and International Patent Application No. PCT/US2006/022503, filed Jun. 9, 2006.

BACKGROUND OF THE INVENTION

1. Field of the Invention

The invention relates to demonstrations of products offered for sale, and more particularly to systems and devices to effect sales demonstrations of products.

2. Description of the Related Art

Products are often made in a variety of models, each having more or less components that offer different features and operational modes. Cars and computers, for example, often have dozens of configurations across the same product line. Household appliances are manufactured in a large variety of shapes, sizes, and colors, and with many different operating features. Vendors of these products typically employ sales persons to demonstrate the various features of a product to potential purchasers.

Manufacturers often make demonstration models of their products for the express purpose of enabling customer demonstrations of the features that the manufacturer wishes to highlight. A demonstrational or demo home appliance not available for purchase may be semi-functional, built to look the same as a production line appliance, but missing many operational elements. For example, a demonstration oven might have the capability to guide a user through an input sequence for specifying cooking temperature and cooking time, but no heat elements would be included in the demo oven. Because demo appliances are not constructed with the same elements and functionality as a production line appliance, the two versions of the appliance must be manufactured separately, which complicates the manufacturing process and adds costs.

It is also known to incorporate software into a product that will cause the product to go into a demonstration mode on order to show selected features of the product. For example, a television might be instructed to play a demonstration video while showing different features of a built-in audio system. Home appliances are sometimes manufactured so that they may be operated in a demo mode. In such cases, it is known to upload or change embedded demonstration software in a product such as an appliance as demonstration needs change. But too often, the needs of a sales demonstration far exceed the capability of built-in software to accommodate them.

It is also known for a manufacturer to hard-code a demo mode into a product such as an appliance before shipping the product to a vendor. Demonstrations are thus not tailored to target the needs of each individual vendor, and promotional offers, which only last a short amount of time, cannot be included in the demonstrations. In rare instances, a computer can be connected to the appliance to alter the programming. However, this involves disassembling the appliance and/or re-writing the code, necessitating the involvement of experienced mechanics and/or programmers. As this consumes excessive time and resources, most demo appliances are simply discarded when the demonstration becomes outdated.

SUMMARY OF THE INVENTION

A product demonstration system according to the invention includes an appliance comprising: a plurality of components having corresponding functionalities; a communications network coupled to the plurality of the components; and a software architecture configured to generate a plurality of messages on the communications network. The software architecture includes a first software operating layer configured to control operation of at least one of the plurality of components by way of a control logic in a first operational state to implement a predetermined cycle of operation performing a physical domestic operation on an article in response to messages sent on the communications network. The software architecture also includes a second software operating layer configured to control the operation of the one component in a second operational state in response to messages sent on the communications network, wherein the control logic by way of the first software operating layer is rendered ineffective unless invoked by way of the second software operating layer. The product demonstration system also includes a smart device external to the appliance, coupled to the communications network, and having memory in which resides demonstration software configured to communicate with the software architecture to enable and instruct the second software operating layer to implement a demonstration mode, directly operating the one component to demonstrate its corresponding functionality independent of implementing or demonstrating the predetermined cycle of operation and without performing the physical domestic operation on the article.

DETAILED DESCRIPTION

Figure 1:
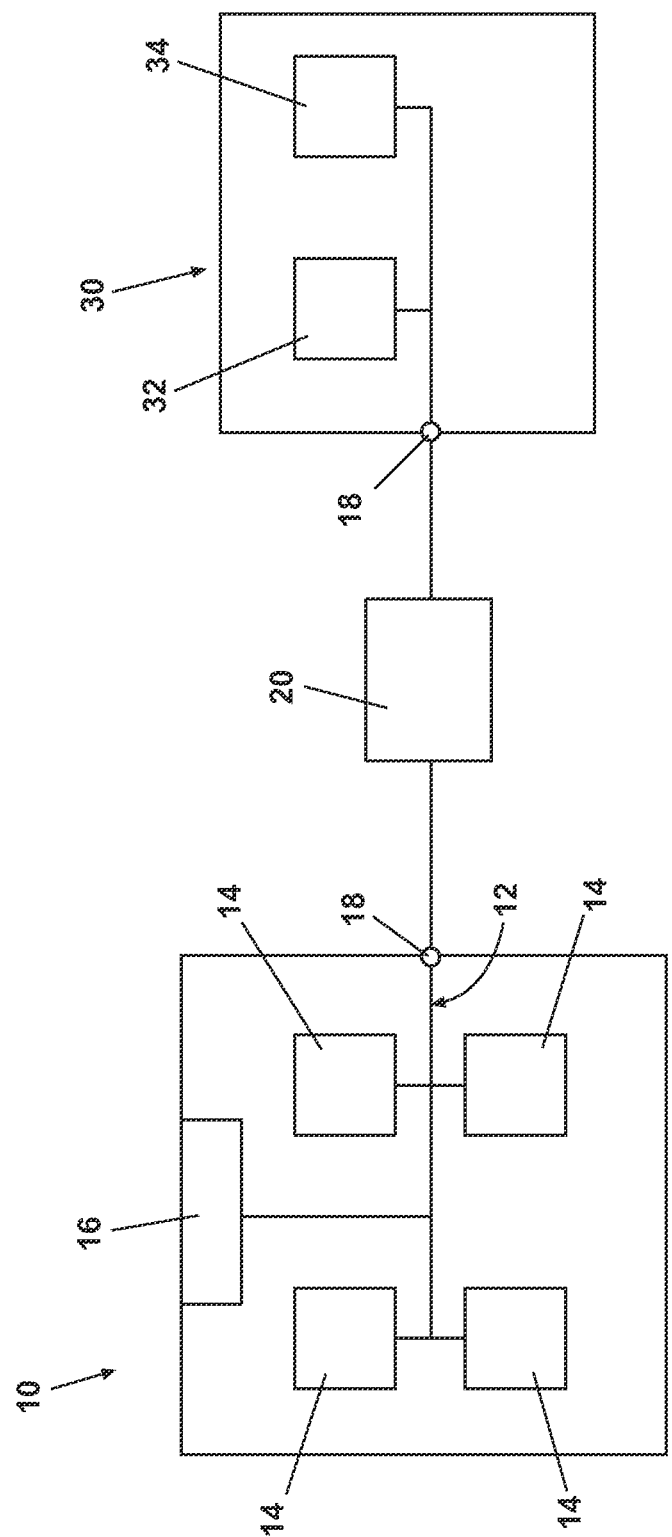
FIG. 1 is a schematic illustration showing a household appliance having an internal communication network connected to a smart device according to the invention.

The invention provides a way to enable a production line product to operate in a demonstration mode, completely controlled from an external device adapted for that purpose. And it does much more as explained below. The invention centers around a smart device connectable to any production product having an internal communications network connecting two or more functional components. The smart device contains demonstration software capable of assuming control of the components in the product and operating them independently of a sales person, but interactively with a potential customer. An example of such a product might be a hybrid automobile with a internal communications network connecting an electric motor with a gasoline engine. The smart device in accord with the invention, can demonstrate features of the automobile inside a showroom in a demonstration mode without having to start the gasoline engine. Another common product type for which the invention can find applicability is in the field of home appliances.

Household appliances typically comprise one or more components which perform the electromechanical operations of the appliance. By employing a software architecture that enables facile communication between internal components of an appliance and between an external component and one or more of the internal components of the appliance, various components and accessories can communicate with the appliance to expand the capability, functionality, and usability of the appliance. The appliance can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The internal components of the appliances can include anything that participates in the operation of the appliance. Examples include a controller (main controller, motor controller, user interface, etc.), which can be a simple microprocessor mounted on a printed circuit board, standing alone or associated with a corresponding device. Other examples include one or more devices such as pumps, motors, heaters, I/O devices and that like that may or may not be controlled by a controller. Typically, the controller components in cooperation either directly or indirectly, through other components, control the operation of all of the components and the associated devices to implement an operation or cycle for the appliance.

The software architecture can be implemented on and communicate over an internal communications network on the appliance. The internal communications network connects the various internal components of the appliance and can be considered a closed network. One example of the internal communications network used within an appliance is the WIDE network protocol, created by Whirlpool Corporation, the assignee of the present patent application.

The software architecture can also expand the communication ability of the appliance by effectively creating an open network Within the appliance, the software architecture can, but does not have to, reside on each of the components that have a controller. Those components with the software architecture form a network node that can communicate with the other nodes.

The software architecture can perform multiple functions. For example, one function can relate to identifying each of the components corresponding to a node on the network, while another function can relate to identifying capabilities or functions of the identified components on the network. Yet another exemplary function is to identify the status of the components on the network. In this way, the software architecture can function to inform all of the nodes on the network of the presence, capabilities, and status of the other nodes.

The software architecture can comprise multiple modules, each of which has different functionality. Various combinations of the modules or all of the modules can reside on each of the components. One module having a basic or core functionality resides on all of the components. In one anticipated configuration, all of the modules reside at least on the main controller, which establishes the main controller to function as a primary or main software architecture, with the other nodes functioning in a client relationship to the main software architecture. In such a configuration, all of the nodes can communicate through the main software architecture. The software architecture can be sufficiently robust that it can permit configurations without a main software architecture or with multiple main software architectures. For example, the controllers of the various components can work together to control the operation of the appliance without any one of the appliances functioning as a main controller. Regardless of the configuration, any component with the software architecture can function as a client with respect to the other components.

Because of the software architecture, the internal components of the appliance are not only connected with one another, but the internal components can also be connected to one or more external components or a new internal component through the network. The external component and/or the new internal component has one, some, or all of the software architecture modules in resident. As a result, the external component and/or the new internal component can communicate with the internal components of the appliance and can also communicate with other external components having the software architecture.

The software architecture can enable communication between the internal components of the appliance and the external component and/or the new internal component or between components external to the appliance. An example of such a software architecture is disclosed in the parent Application No. US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, and incorporated herein by reference in its entirety. All of the communications between internal and external components and/or any combination of components described in this application can be implemented by the software and network structures disclosed in this application.

The software architecture can be implemented by providing one or more of the software elements of the software architecture at least on each of the internal and external components to be controlled. The software architecture is preferably configured to generate a plurality of messages, with at least one of the software elements residing in each of the components and configured to enable transmission of at least one of the plurality of messages between the components. The messages can be transmitted for bi-directional communication between components. The messages can include command messages that are used to implement a physical domestic operation cycle of the appliance.

The messages can be generated by a message generator, which can take the form of the software architecture, an external component, or an internal component. One possible message generator is a user interface. It will thus be apparent that an internal communications network in the product can be formed of the software architecture resident on a single controller, which, in turn, is connected to one or more devices, none of which have its own controller or software. Also, the internal communications network can be formed of multiple devices, any one or more of which may have a separate controller.

FIG. 1 illustrates the invention in the context of a household appliance, designated generally by the numeral 10 in a schematic diagram. The appliance 10 in this embodiment can be any from the group of appliances discussed previously, or any similar product. The appliance 10 preferably includes the previously discussed software architecture having an internal communication network 12 interconnecting a plurality of components 14, wherein each component is capable of communicating with the network 12 by way of the software architecture. The components 14 are conventional and include, for example, motor control microprocessors, key pads, timers, displays, and other devices and controls typically included within the household appliance 10. It is to be understood that the appliance 10 in the context of the invention is a production unit that can be purchased by a customer from a vendor for immediate use without modifications.

The appliance 10 can include a user interface 16 as is commonly used with appliances. The user interface 16 enables a user to actuate and specify the parameters for various operations of the appliance 10. The user interface 16 can include, but is not limited to, any number of well-known features, such as a digital display, speakers, a touch screen, a key pad, buttons, switches, dials, lights, and the like.

The household appliance 10 has an internal/external communications connection 18. The internal/external communications connection 18 can be any suitable connecting device, such as a wire or wireless port, an Ethernet connector, a wireless-G connector, a USB port, a serial port, and the like. The internal/external communications connection 18 is capable of connecting to various network interface devices 20 for enabling communication with various external clients or devices. Examples of suitable external network interface devices 20 comprise any suitable and well-known serial, wireless, infrared, USB and TCP/IP device which would be apparent to one skilled in the art. The connection between the internal/external communications connection 18 and the network interface device 20 can be made permanent or temporary. One external client that can be connected to the appliance 10 via the internal/external communications connection 18 by way of the network interface devices 20 is a smart device 30, according to the invention. The smart device 30 is operably coupled to a network interface device 20.

Figure 2:
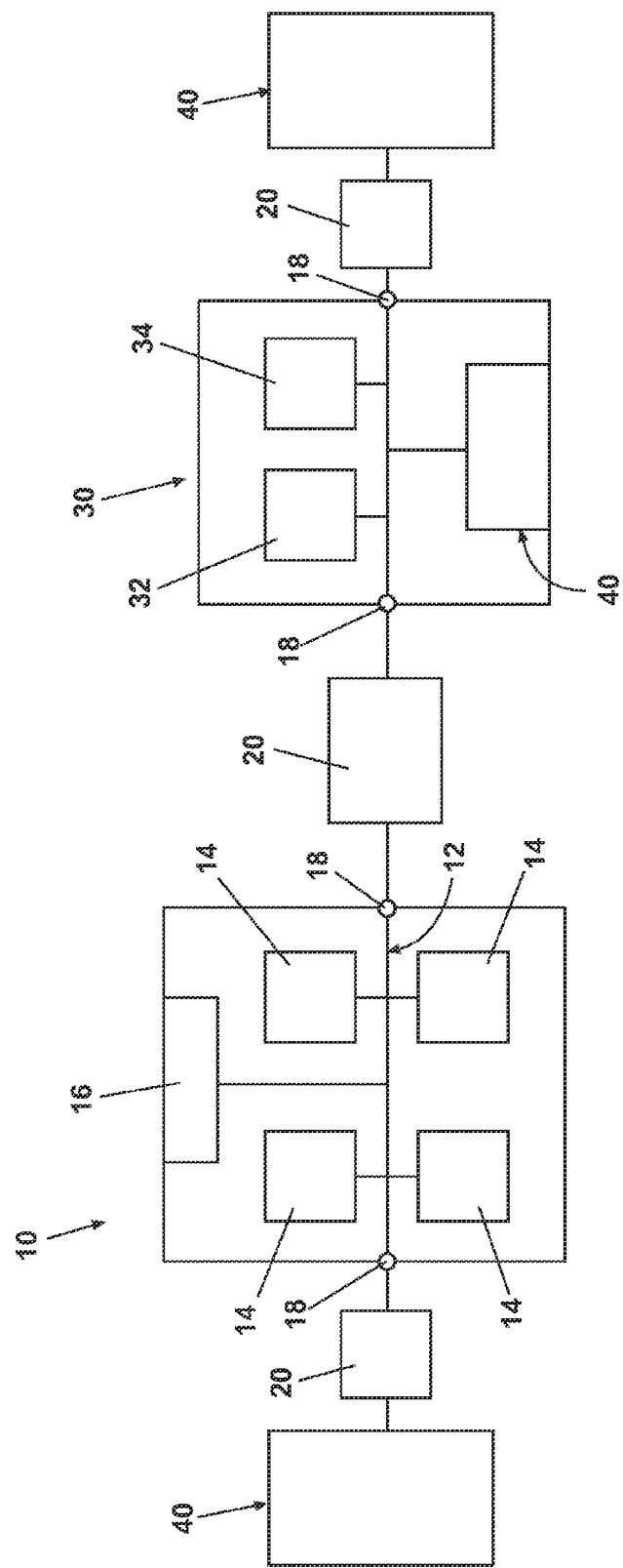
FIG. 2 is a schematic illustration of the household appliance and the connected smart device of FIG. 1 and further incorporating a plurality of connected demo devices.

Referring now also to FIG. 2, the smart device 30 can itself comprise a network interface device 20 for removably coupling to the internal/external communications connection 18 of the appliance 10. The smart device 30 comprises a read-write memory component 32 and a controlling component 34, and can be a dedicated device, or be incorporated in such devices as a laptop computer, remote control, a PDA, a cell phone, or a dongle. The smart device 30 can be powered by any suitable means, such as by an internal battery or from a connection to an outside power source. The smart device 30 can include power transmission means for delivering power to the appliance 10, such as through the communications connection 18. Since, according to the invention, the smart device 30 will control the appliance 10 in a sales demonstration mode, as explained below, it need only deliver enough power to the appliance to effectively operate such a mode. The smart device 30 can also be enabled to connect to other devices (such as the internet) by way of additional internal/external communications connections 18 and other network interface devices 20.

The smart device 30 will have its own software capable of communicating with the internal communication network 12 in the appliance 10. According to the invention, when the smart device 30 is coupled to the appliance 10, the smart device 30 assumes at least some control of the individual components 14 of the appliance 10. For example, the smart device 30 can assume complete control of the appliance 10 and command the appliance 10 to enter a passive state. The smart device 30 can automatically assume control of the appliance 10 upon connection of the smart device 30 to the internal/external communications connection 18. Alternatively, additional stimulation can be required to initiate control of the appliance 10 via the smart device 30, such as by flipping a switch on the smart device 30 or the appliance 10, or by entering a specific key sequence on the user interface 16. Once the smart device 30 has established control of the appliance 10, the smart device 30 can operate the various components 14 of the appliance 10 in a manner different than the components 14 would be operated during normal operation. This unique ability enables the smart device 30 to change the operational capabilities and behavior of the appliance 10 temporarily without requiring any modifications of the appliance 10 or its components 14.

The smart device 30 can use its memory component 32 to store sales demonstration software, for example, hereinafter referred to as "sales demos", which can be accessed by the controlling component 34. The controlling component 34 can communicate with and control the appliance 10 to execute the sales demos. Sales demos can be designed to highlight features of the appliance 10 for the customer and can be interactive with the customer. Exemplary sales demos include, but are not limited to, video presentations, audio presentations, displaying promotions and/or advertisements, light and sound shows, textual displays, 3-D simulations, slideshows, voice feedback, key presses, voice command and control, motion sensing, mechanical system custom demonstrations, and any combination thereof. Sales demos can be updated, deleted, modified, and downloaded to the memory component 32 of the smart device 30. This can be accomplished by connecting a network interface device 20 to an appropriate source (such as the internet) by way of an internal/external communications connection 31 of the smart device 30. Examples of appropriate source include, but are not limited to, a computer, a PDA, a remote control, a cell phone, a dongle, an i-Pod®, the internet, and a USB drive. Sales demos can thus be made adaptable to the needs of different vendors and/or manufacturers by downloading different sales demos and/or modifying or updating existing sales demos accordingly.

As the software architecture enables control of individual components 14 of the appliance 10, the smart device 30 can take advantage of this capability and combine the control of the components 14 with the control of one or more demo devices 40. A demo device 40 can be a device external to the appliance 10 that aids in the presentation of sales demos. The demo devices 40 will be expected to have their operation controlled at least in part by the smart device 30. Examples of such devices include, but are not limited to, a proximity sensor, an LCD display, a speaker, a computer, a touch screen, a keyboard, a monitor, a mechanical device, a light display, a microphone, a camera, a phone, or the like. Demo devices 40 can be completely or partially controlled by the smart device 30. Demo devices 40 can be embedded in the smart device 10. Demo devices 40 can instead comprise a network interface connection 20 and can be connected to either the appliance 10 or to the smart device 30 via an additional internal/external communications connection 18. Each demo device 40 can be enabled with the same software architecture as the appliance 10 whereby the demo device 40 establishes a node on the internal communication network 12 or is part of an existing node on the network 12. If a demo device 40 is not enabled with the same software architecture as the appliance 10, the smart device 30 can optionally serve as a protocol bridge between the demo device 40 and the appliance 10. A protocol is a standard procedure for regulating data transmission between devices; however, not all devices necessarily communicate in the same protocol. A bridge effectively translates one protocol into another so that devices with different protocols can communicate with one another. Thus, the bridge functionality can be incorporated into the smart device 30 and the user does not need to purchase a separate bridge in order for the demo device 40 to communicate across the internal communication network 12.

Figure 3:
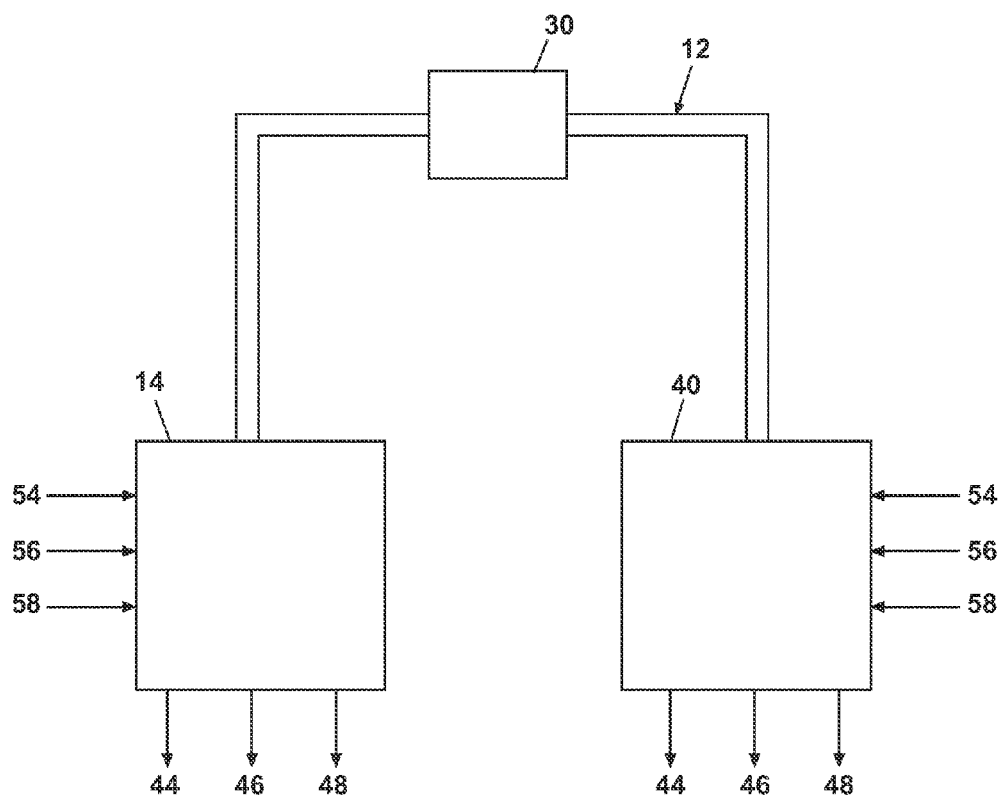
FIG. 3 is a schematic illustration of the smart device of FIG. 1 in use with a component of the appliance and a demo device and showing the capabilities of the component and the demo device.

In order to present the sales demos, the smart device 30 can utilize both the internal components 14 of the appliance 10 and/or demo devices 40, an example of which is illustrated in FIG. 3. An internal component 14 and a demo device 40 can each have visual output 44, audio output 46, and/or sensory output 48 capabilities which can serve a number of purposes, such as encouraging customers to interact with the appliance 10, offering product information and demonstrations, and presenting various promotions and advertisements. The internal component 14 and demo device 40 can also have visual input 54, audio input 56, and/or sensory input 58 capabilities which can serve additional purposes, such as answering customer questions, responding to customer commands, and collecting information regarding the customer and his or her behavior. The internal component 14 and demo device 40 can be controlled to operate passively or to require customer actuation for operation.

Figure 4:
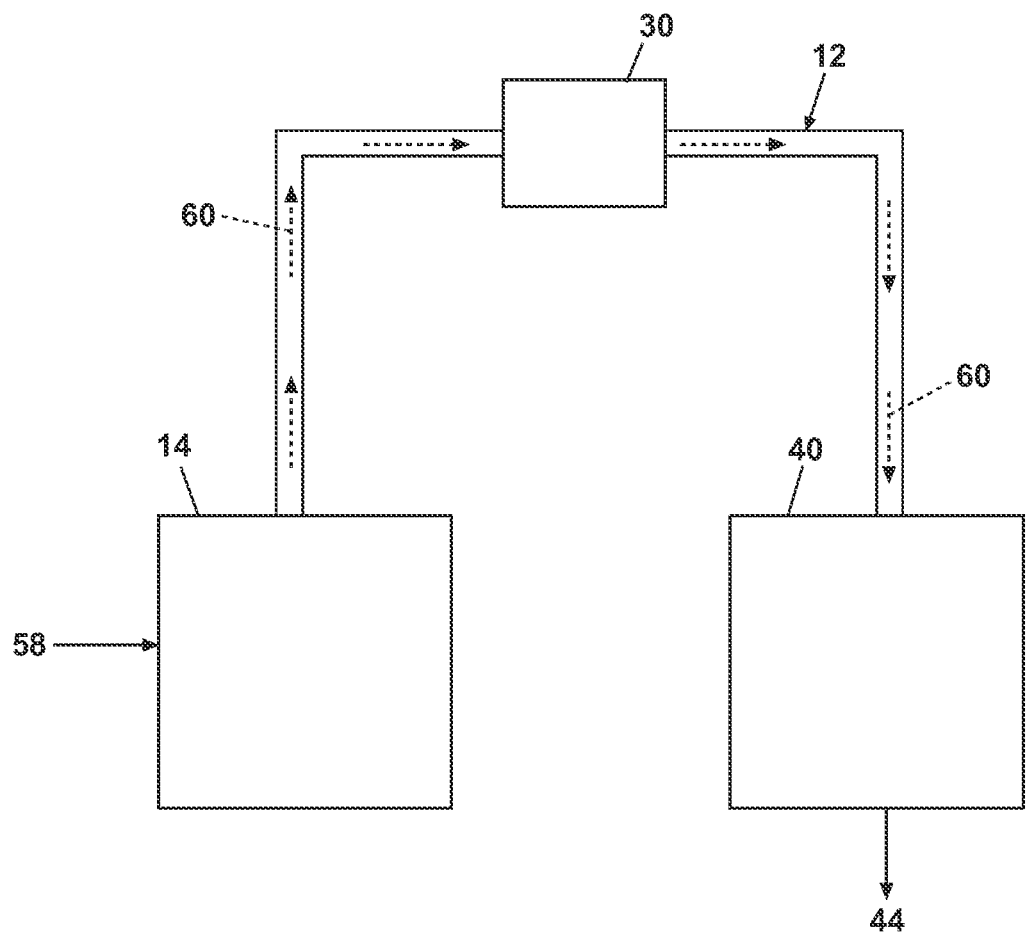
FIG. 4 is a schematic illustration of the smart device, component, and demo device of FIG. 4 and showing communication via messages therebetween.

Referring now to FIG. 4, the smart device 30 can also command the internal component 14 and demo device 40 to work in combination with other internal components 14 and/or demo devices 40. For example, a component 14 or demo device 40 capable of receiving sensory input 58, such as a button or a motion sensor, can send a detailed message 60 across the internal communication network 12 upon receiving sensory input 58 from a customer. A demo device 40 or an internal component 14 having visual output 44 means, such as a light on the appliance 10 or an LCD screen hanging above the appliance 10, can receive the message 60 and provide certain visual output 44 responsive to the sensory input 58. The relationships between components 14 and demo devices 40 and the reactions to messages sent therebetween can be controlled by the smart device 30.

Figure 5:
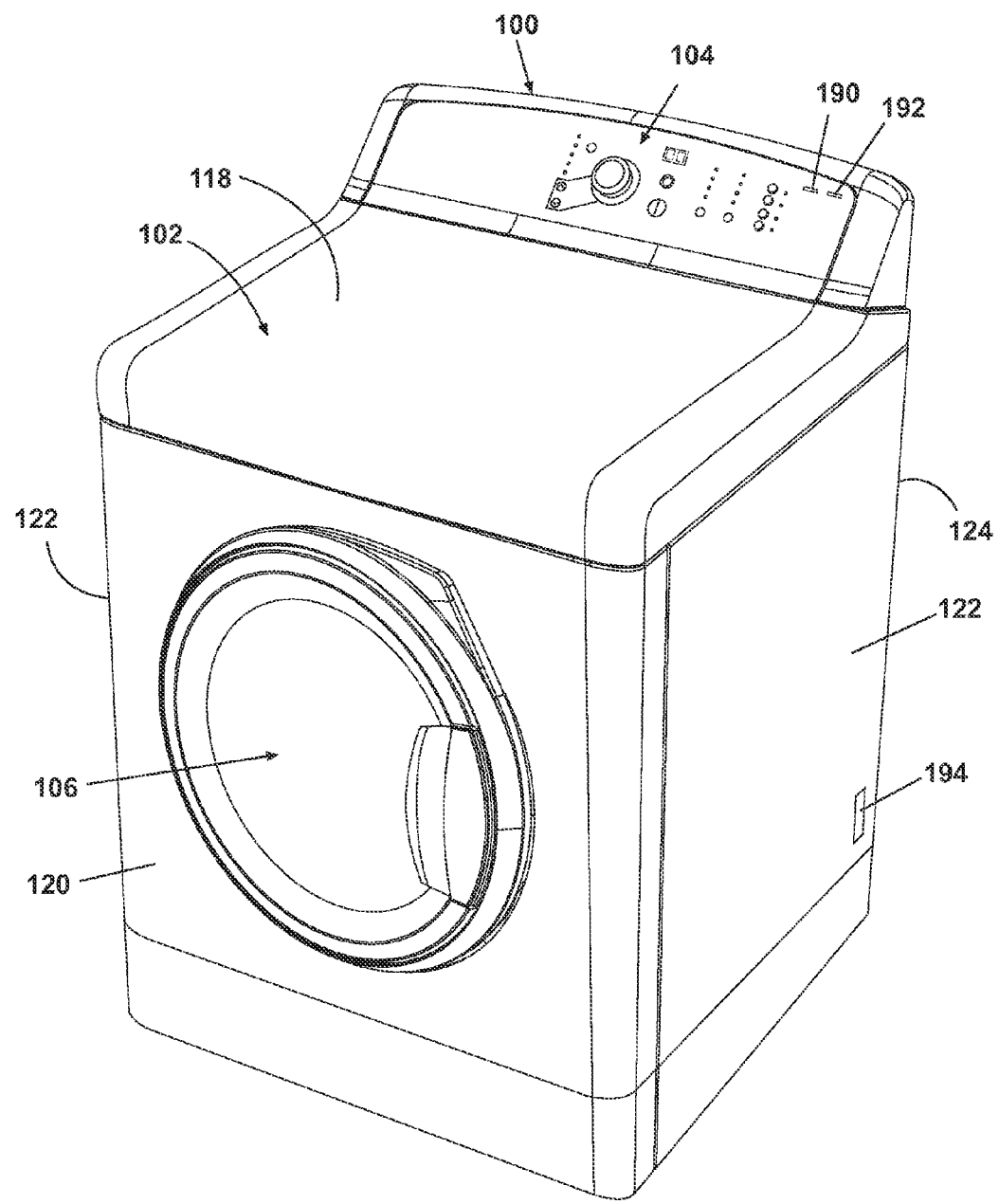
FIG. 5 is a perspective view of a dryer capable of connecting to a smart device according to one embodiment of the invention.
Figure 6:
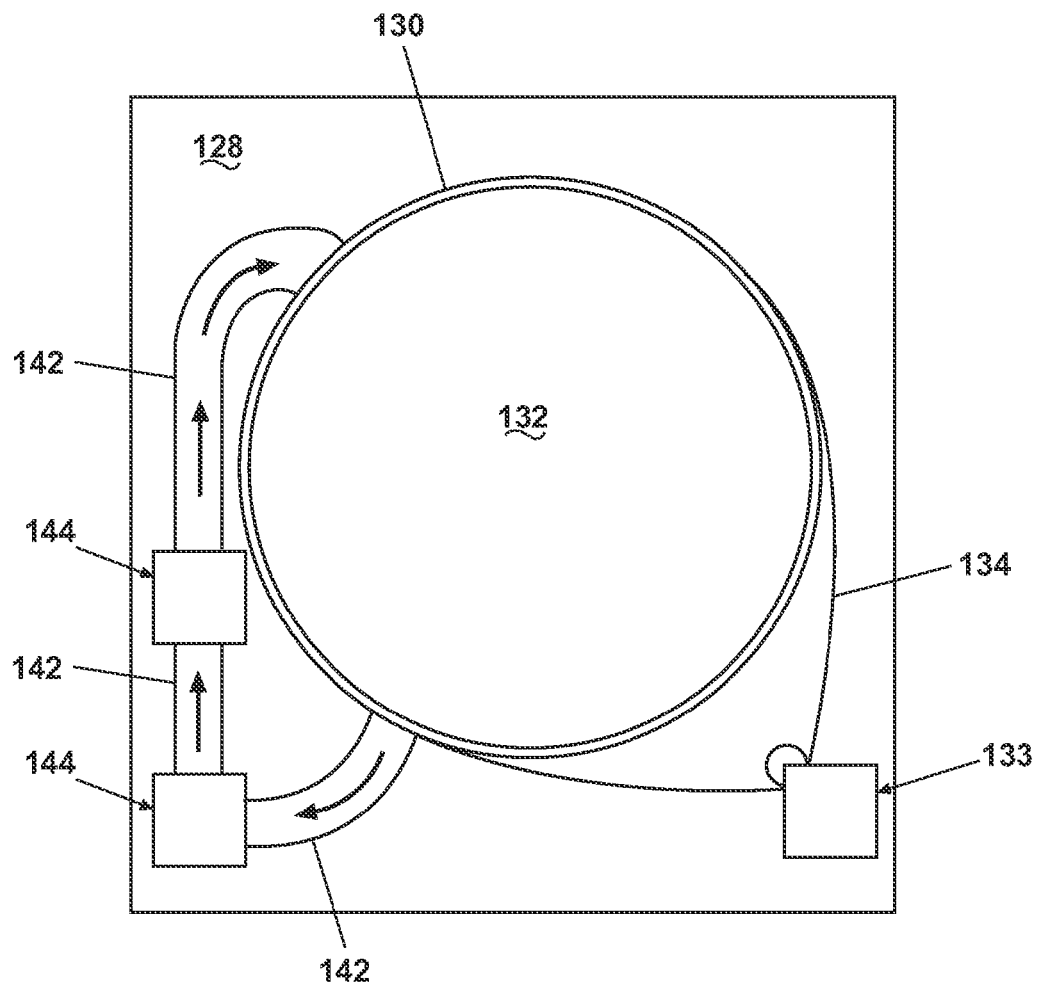
FIG. 6 is a schematic illustration of the interior of the dryer of FIG. 5.

An example of a household appliance according to the invention is illustrated in FIGS. 5 and 6 as a dryer. The clothes dryer 100 described herein shares many features of a well-known automatic clothes dryer, and will not be described in detail except as necessary for a complete understanding of the invention. In this example, the dryer 100 includes a feature wherein the dryer 100 can adjust the pressure in the flow of air to accommodate different load types and different home venting systems. The dryer 100 includes a plurality of elements common to a dryer, such as a cabinet 102 having a user interface 104 for controlling the operation of the dryer 100, a partially translucent door 106 hingedly attached to a front wall 120 of the cabinet 102, a rear wall 124, and a pair of side walls 122 supporting a top wall 118. Two internal/external communications connections in the form of two USB ports 190, 192 are located on the user interface 104.

Looking now more closely at FIG. 6, the interior 128 of the dryer 100 comprises a rotating drum 130 having an open front for access to the interior of the drum 130 which defines a drying chamber 132. The cabinet 102 also encloses a drum motor assembly 133 adapted in a well-known manner for rotating the drum 130 via a drum belt 134. A blower assembly 140, a flexible dryer hose or similar conduit 142, and a heater assembly 144 in fluid connection with one another and the drying chamber 132 are also enclosed by the cabinet 102. An exhaust (not shown) is provided in the rear wall 124 of the dryer 100 for connection to a home venting system (not shown) for venting air.

Figure 7:
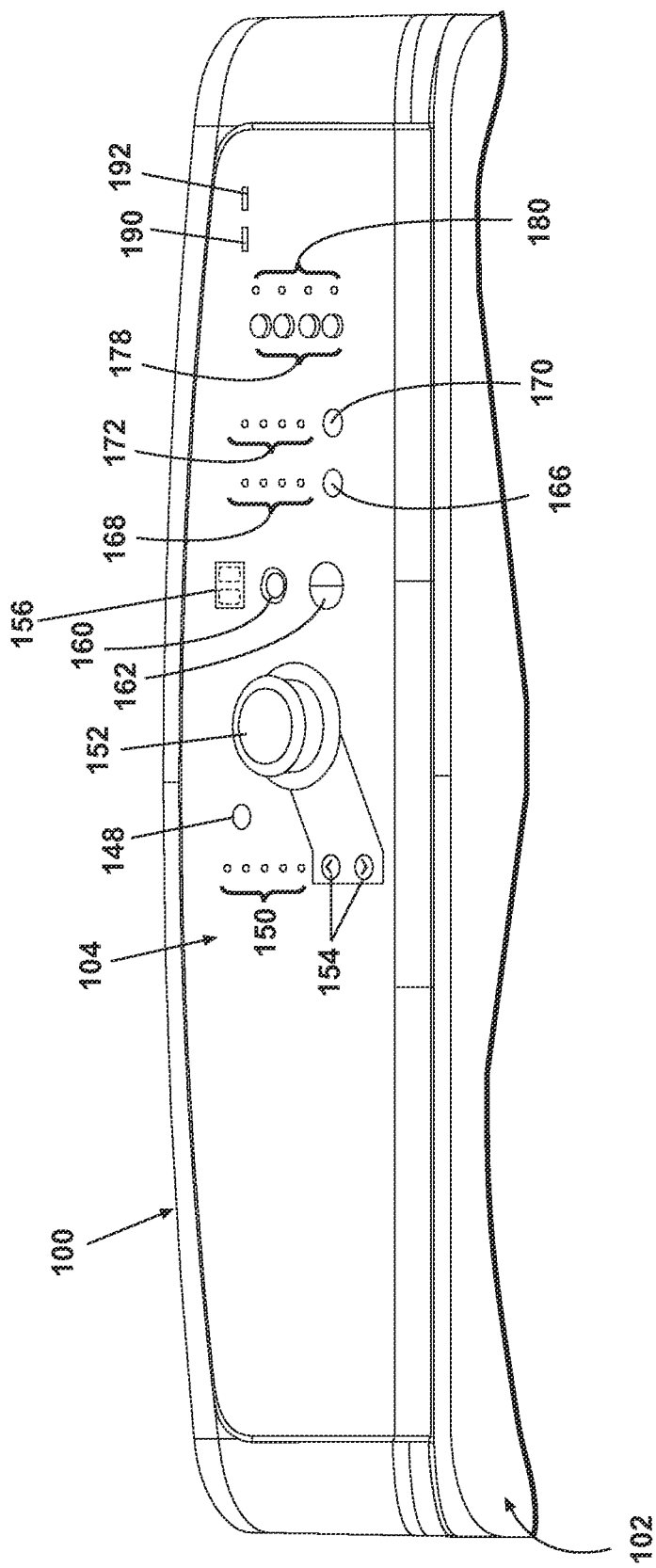
FIG. 7 is a perspective view of a user interface on the dryer of FIG. 5.

In normal operation of the dryer, a user first selects an appropriate drying cycle by means of the user interface 104. FIG. 7 illustrates various features that can be included on the user interface 104, including a power button 148, dryer status indicator lights 150, a dial 152, parameter adjusting buttons 154, a digital display 156, a start button 160, a stop button 162, a first parameter selection button 166, a first set of indicator lights 168, a second parameter selection button 170, and a second set of indicator lights 172, on/off buttons 178, and on/off indicator lights 180. These features can be marked with appropriate indicia to indicate their function. Selecting the drying cycle can require a user to manipulate several of these features to initiate operation and specify common drying cycle parameters. Examples of such parameters include, but are not limited to cycle type, heat level, dryness level, air level, temperature, and cycle length.

Figure 8:
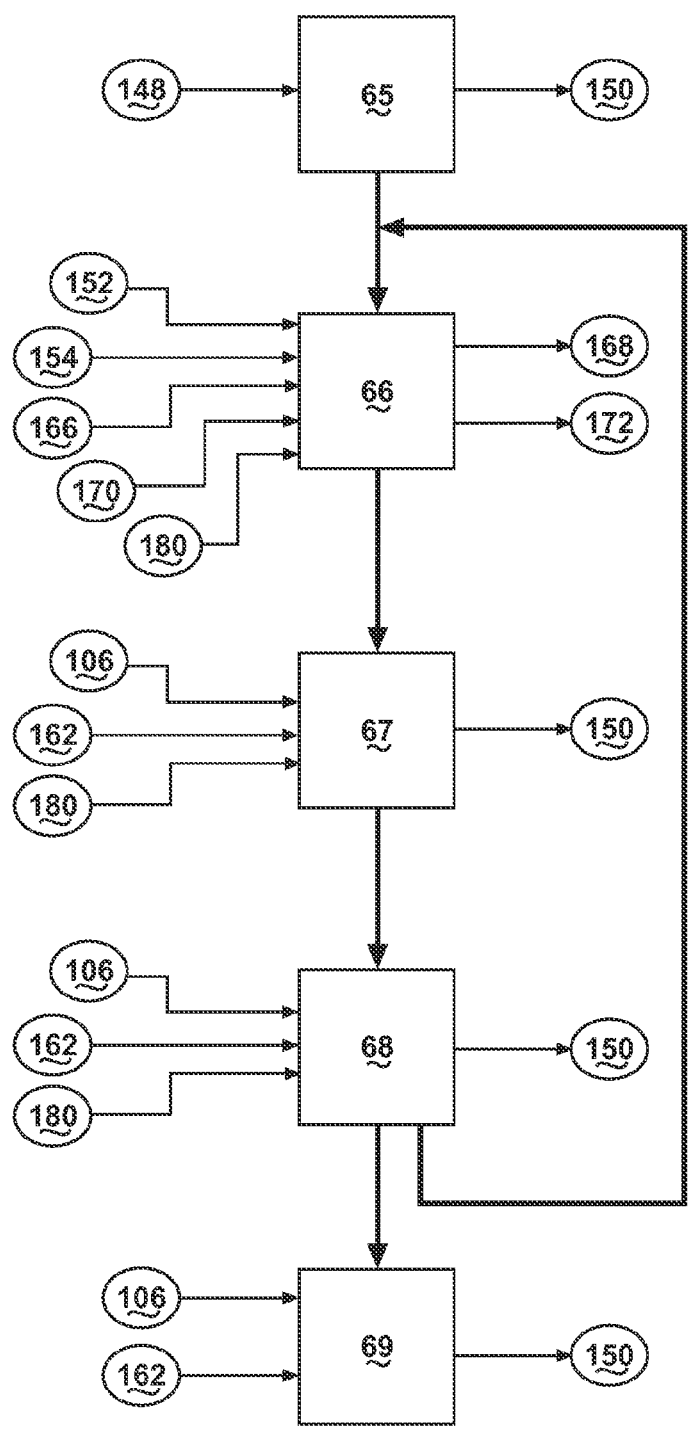
FIG. 8 is a flow chart illustrating normal operation of the dryer of FIG. 5.

For the particular dryer 100 described herein, normal operation of the dryer 100 comprises a number of steps 65, 66, 67, 68, and 69 as illustrated in FIG. 8. Each step is illustrated herein as a box. A feature on the user interface 104 that can be manipulated to effect or affect a given step is illustrated as a circle having an arrow pointing therefrom towards the given step. A feature on the user interface 104 that produces visual output at a given step is illustrated as circle having an arrow pointing thereto from the given step. A first step that must be completed prior to the beginning of a second step is signified by a thickened arrows pointing from the first step towards the second step.

A user powers up the dryer 100 at a power-on step 65 by pressing the power button 148. At least one of the status indicator lights 150 associated with an "on" state of the dryer 100 will become lit upon pressing of the power button 148.

Next, a user can select the drying cycle parameters at a parameter selection step 66. The dial 152 can be rotated to select an appropriate drying cycle type. Examples of specific drying cycles include, but are not limited to, a touch-up cycle, an express dry cycle, a timed dry cycle, a heavy duty cycle, a cotton/towels cycle, a normal cycle, a bulky/bedding cycle, cottons cycle, a delicates cycle, a linens cycle. If the drying cycle type is a timed drying cycle, the user can select a desired cycle length using the parameter adjusting buttons 154 to adjust the number of minutes that the cycle will last. The user can also select a desired dryness level and a drying temperature using the first parameter selection button 166 and the second parameter selection button 170 respectively. The first set of indicator lights 168 and the second set of indicator lights 172 correspond to the first parameter selection button 166 and the second parameter selection button 170 respectively. Each light in each set 168, 172 correspond to a different dryness level and a different temperature level respectively. The buttons 166, 170 can be pressed repeatedly to select the different levels.

Once the parameter selection step 66 is complete, the user can press the start button 160 to begin the drying cycle step 67. As is well-known, the door 106 includes sensing means (not shown) to ensure that the drying cycle will not start if the door 106 is not closed. In accordance with the selected parameters, various components 14 of the dryer will perform a drying cycle. Throughout the drying cycle, the dryer status indicator lights 150 will reflect the operation of the dryer 100. The motor assembly 133 rotates the drum 130 via the belt 134. The blower assembly 140 draws air out of the drying chamber 132 and into a flexible dryer vent hose 142. The blower assembly 140 then circulates the air through a heater assembly 144 to heat the air. The heated air is then propelled through the hose 142 and into the drying chamber 132. Air is vented through the exhaust so as to remove moisture from the drying chamber 132. This cycle continues according the selected parameters. The motor assembly 133, blower assembly 140, and heater assembly 144 can operate at different levels during the drying cycle.

At any time during the cycle, the door 106 can be opened or the stop button 162 can be pressed to initiate a drying cycle end step 68. Once the drying cycle end step 68 has been completed, the dryer 100 can be completely shut off at a power-off step 69 by pressing the power button 148. This will cause the status indicator light 150 that was turned on during the power-on step 65 to turn off. Alternatively, after the drying cycle end step 68, new drying parameters can be entered at the parameter selection step 66. Steps 66, 67, and 68 can be repeated in sequence as many times as desired by a user.

On/off buttons 178 can preferably be pressed at any time during steps 66, 67, and 68 to activate or deactivate additional functions of the dryer 100. On/off indicator lights 180 indicate whether or not the additional functions are activated. Additional functions can include turning on a drum light for enabling easy viewing of the contents of the dryer 100, providing an audible signal to a user when clothes in the dryer 100 are partially dry, extending the drying cycle for additional length of time without heat after completion of the user-specified drying cycle in order to avoid wrinkling, and setting the volume of any audible signals generated by the dryer 100.

Figure 9:
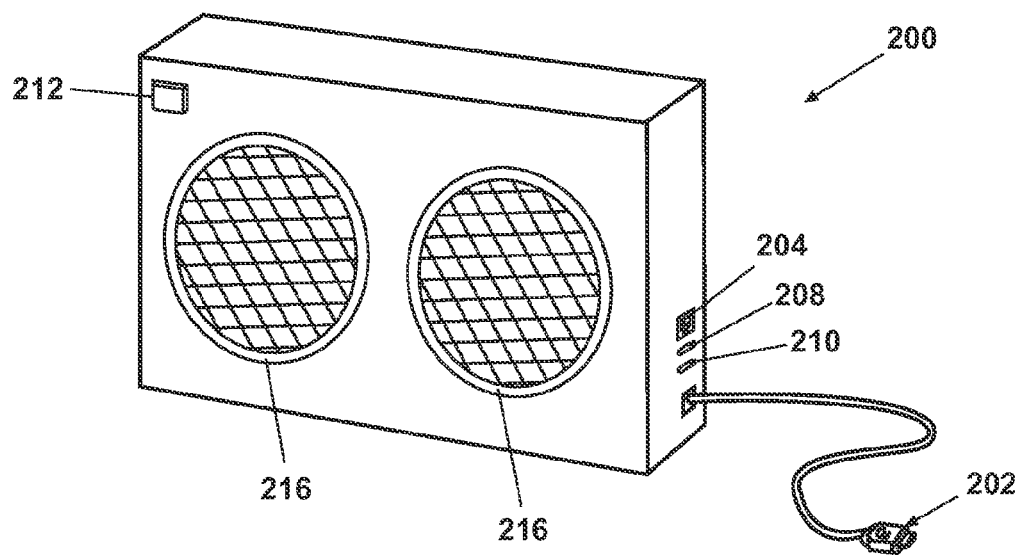
FIG. 9 is a perspective view of a smart device for connection to the dryer of FIG. 5.

In order to demonstrate the dryer 100, according to the invention, a salesperson or other store personnel can provide a smart device 200, such as that shown in FIG. 9. The smart device 200 includes a network interface device in the form of a USB device 202. The USB device 202 is configured to be plugged into the USB port 190 on the user interface 104 of the dryer 100. The smart device 200 also comprises internal/external communications connections in the form of an Ethernet connector 204, two USB ports 208, 210, and a wireless port 212. The smart device 200 includes a rechargeable battery (not shown) that can be charged via USB port 210 by inserting an appropriate charger cord (not shown) into the port. Two speakers 216 for emitting sound are embedded in the smart device 200. The smart device 200 need not be disposed for customer access, but in this particular embodiment, the speakers need to be disposed so they can be heard. In the illustrated embodiment, the smart device 200 is mounted on a wall 218 behind the dryer 100 such that the speakers 216 are facing outward towards the customers.

Figure 10:
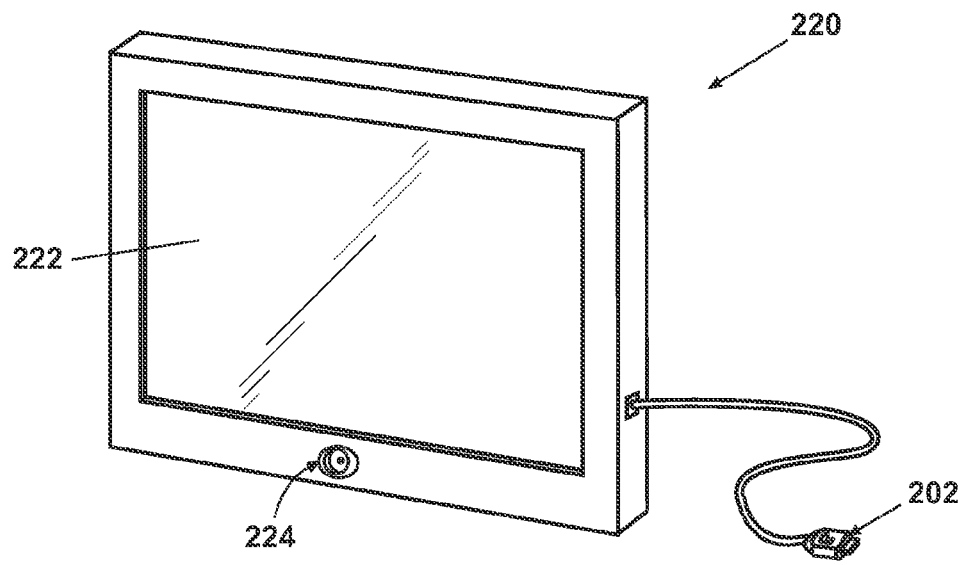
FIG. 10 is a perspective view of an LCD monitor for connection to the smart device of FIG. 9.

Looking now at FIG. 10, a demo device in the form of an LCD monitor 220 includes a USB device configured to be plugged into the USB port 208 of the smart device 200. The LCD monitor 220 is disposed so that it can be seen by a customer. For example, it can rest on the dyer or be mounted to a separate stand or be mounted to a wall if proximate the dryer such as wall 218, etc. The LCD monitor 220 includes a screen 222 capable of displaying video and images. The LCD monitor 220 further comprises a smart camera 224 positioned inconspicuously on a portion thereof and configured to capture images of customers in the vicinity of the dryer 100. The smart camera 224 is able to distinguish between certain types of customers, such as males versus females and children versus adults. This information is available to the smart device 200. The LCD monitor 220 and camera 224 are powered by the smart device 200 via the USB port 208.

Figure 11:
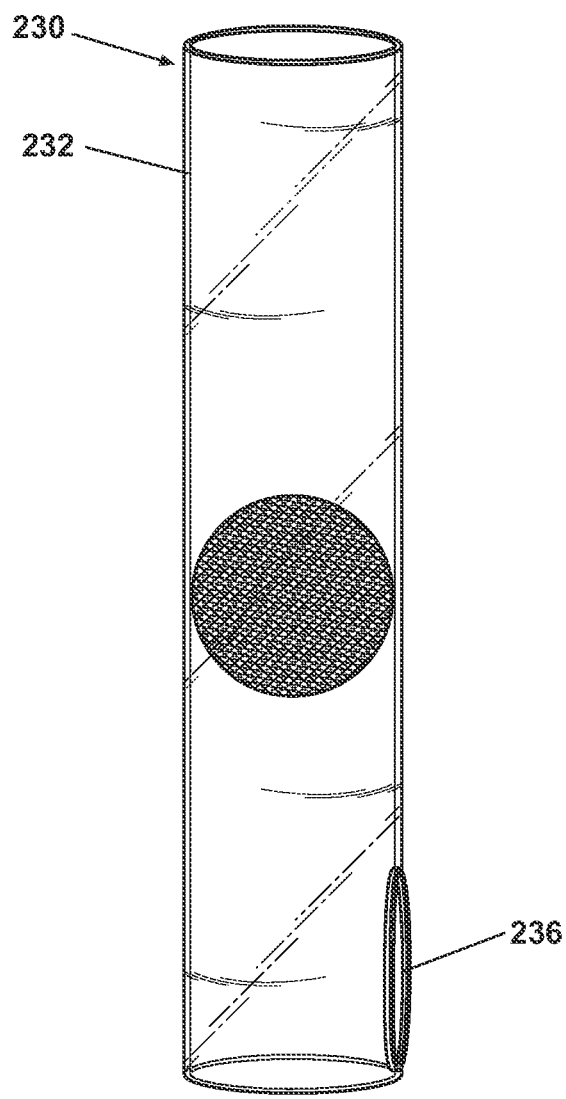
FIG. 11 is a perspective view of an air flow demo unit for connection the dryer of FIG. 5.

Looking now at FIG. 11, a demo device in the form of an air flow demo unit 230 comprises an elongated transparent conduit 232 and a lightweight ball 234 moveably disposed therein. The conduit 232 is removably mounted to the rear of the dryer 100. The conduit 232 is preferably a vertically-oriented hollow cylinder. The conduit 232 is rigid enough and suitably mounted so that it extends for a distance above the dryer 100 without necessitating additional support. The conduit 232 is formed of any material suitable for the purposes described herein, such as a transparent and rigid plastic. The ball 234 is preferably spherical in shape and has a diameter lightly less than the inner diameter of the conduit 232 so that it can freely move vertically therein. The ball 234 is preferably hollow and formed of a low density, low weight substance, such as a plastic. The ball 234 is formed so that it can be seen inside the conduit 232, such as by dyeing the ball 234 in a bright color such as red. A lower end of the conduit 232 comprises an opening 236 configured for connection to and airtight fluid communication with the exhaust of the dryer 100.

Figure 12:
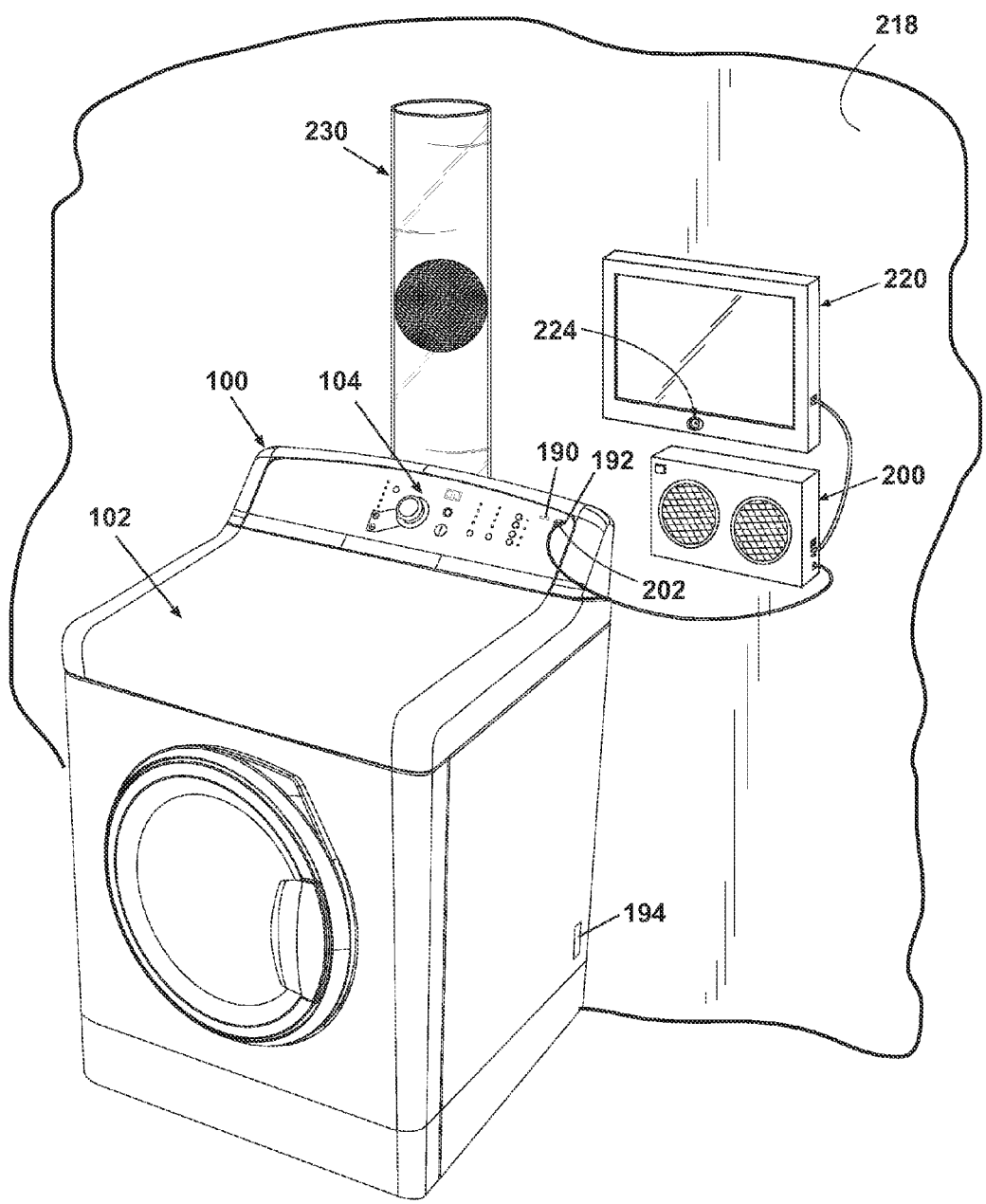
FIG. 12 is a perspective view of the smart device of FIG. 9, the LCD monitor of FIG. 10, and the air flow demo unit of FIG. 11 in use with the dryer of FIG. 5.

The various connections among the appliance 100, the smart device 200, and the demo devices 220, 230 can be seen in FIG. 12. The smart device 200 is connected to the dryer 100 by plugging the USB device 202 into the USB port 192 on the dryer 100. Once the smart device 200 is plugged in 304, the dryer 100 operates in a passive mode, and the smart device 200 assumes complete control of the dryer 100 to present a sales demo 240.

Figure 13:
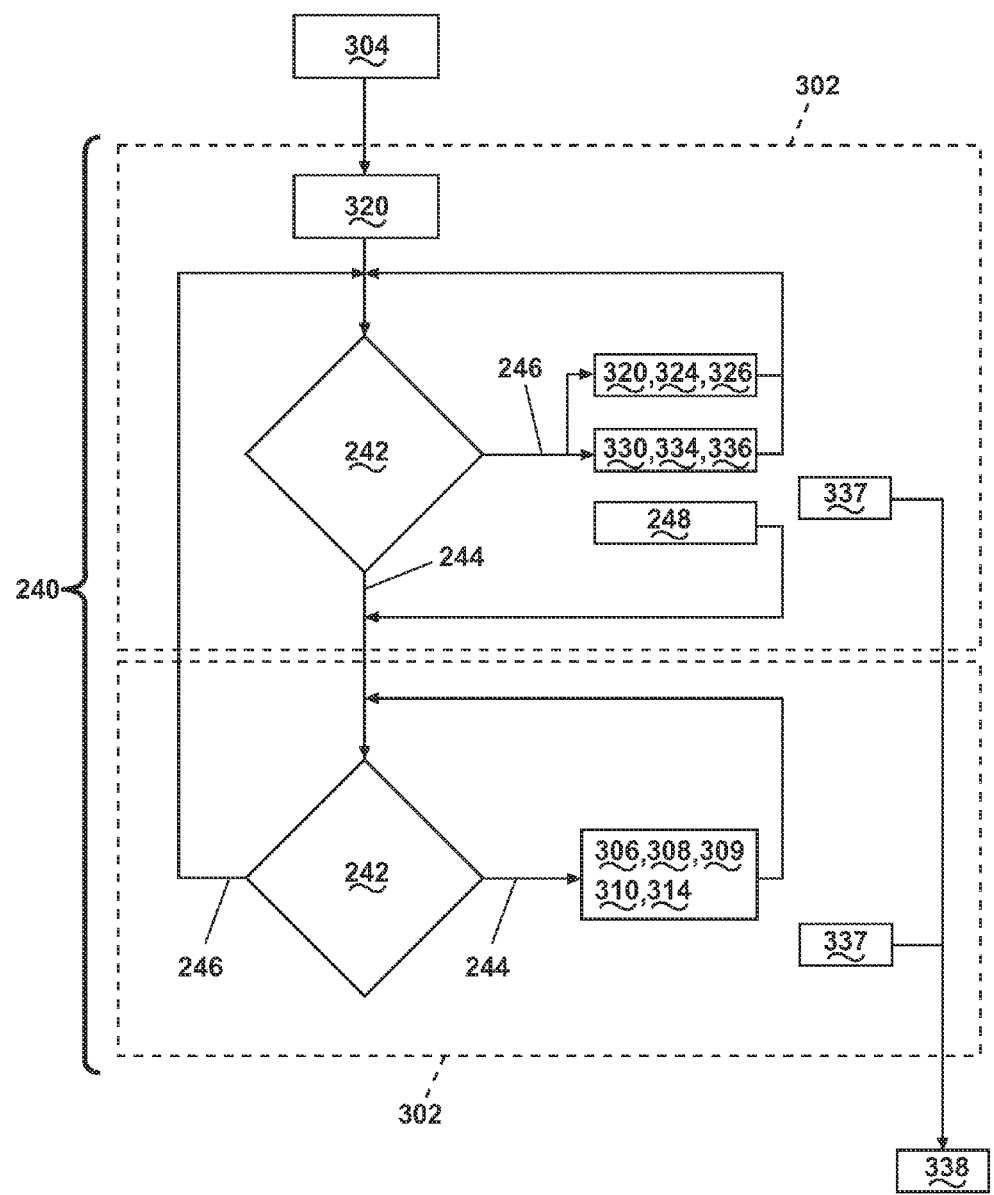
FIG. 13 is a flow chart illustrating a sales demo to be executed and performed by the smart device, LCD monitor, air flow demo unit, and dryer of FIG. 12.

Looking now also at FIG. 13, the smart device 200 automatically powers up the dryer 100 upon being plugged in 304 and begins operation in an active sales demo mode 302, which will be discussed in more detail hereinafter. It is noted that the dryer 100 will be connected to a source of power sufficient to operate the blower 140. That source may be the smart device 200 itself or an independent source. The smart camera 224 and the user interface 104 on the dryer 100 continuously perform a check 243 for the presence 246 of customers throughout the entire sales demo 240. The smart camera 224 continuously searches for customers within a certain distance of the dryer 100. The user interface 104 also waits for and receives any input received from the customer. Customer presence 246 is detected through the manipulation of power button 148, dial 152, parameter adjusting buttons 154, start button 160, stop button 162, first parameter selection button 166, second parameter selection button 170, or on/off buttons 178, or by way of the smart camera 224 detecting a customer in close proximity to the dryer 100

The smart camera 224 can identify certain characteristics of customers using embedded software, such as approximate age and gender. The smart camera 224 can store records of these characteristics. The smart camera 224 can provide this information to the smart device 200 to enable to the smart device 200 to tailor the sales demo 240 to suit a particular customer. An example of such tailoring is targeting male and female customers separately by interchangeably presenting two demos using two different color schemes. One color scheme has been developed to elicit a more positive response from females, and one color scheme has been developed to elicit a more positive response from males. Other examples could include, but are not limited to, using different types of music, using different voices, using different advertising concepts, and highlighting different features.

If no customers are detected 244 within a certain distance of the dryer for a predetermined length of time specified by the sales demo 240, the smart device 200 switches the dryer 100 into a default sales demo mode 300. If a customer presence 246, the smart device 200 will switch the dryer 100 back to the active sales demo mode 302. The default sales mode 300 will also run if a customer presses 248 the stop button 162 at any time during the active mode 302.

In the default sales demo mode 300, the smart device 200 operates the dryer 100 to present a light show 306 using the dryer status indicator lights 150, the first set of indicator lights 168, the second set of indicator lights 172, and the on/off indicator lights 180. The various lights are turned on and off to produce a number of visually-stimulating patterns. The smart device 200 also operates the digital display 156 to output a variety of displays 308 designed to draw the attention of potential customers, such as a greeting or an aesthetically pleasing pattern. The smart device 200 can operate the LCD monitor 220 to display a variety of promotional offers 309, advertisements 310, and the like. One example would be displaying the text, "20% off, today only," accompanied by eye-catching graphics depicting the dryer 100. The smart device 200 can operate the speakers 216 to output an invitational voice clip 314 inviting customers to interact with the dryer 100 as well. An example of such an invitational voice clip 314 could be an inviting phrase reciting "please press any button to learn about our featured dryer".

If the user interface 104 detects that a customer presence 246, the smart device 200 will respond by converting to the active mode 302. The smart device 200 will first output an introductory voice clip 320 through speaker 216. The introductory voice clip 320 will comprise voice instructions inviting the customer to turn the dial 152 or press one of the buttons to learn about each feature of the dryer. The introductory voice clip 320 will also invite the customer to press the start button 160 to learn about the special drying air flow feature of the dryer 100. The introductory voice clip 320 includes instructions informing the customer that the stop button 162 can be pressed at any time to exit the dryer demonstration.

If a customer presses one of the buttons 148, 160, 162, 166, 170, 178, the smart device 200 will output a feature-specific voice clip 322 through the speaker 216. For example, if an on/off button 178 if pressed and the button 178 has indicia indicating it functions to turn a drying chamber light on and off, a feature-specific voice clip 322 could be played that says, "The light feature will allow you to view the contents of the dryer without halting dryer operation." Throughout the active mode 302, the LCD monitor 220 also displays various video clips 324 to support the feature-specific voice clips 322. For example, as the speakers 216 output a voice saying "the light feature will allow you to view the contents of the dryer without halting dryer operation," the LCD monitor 220 will show a video clip 324 of the light turning on and off while a number of clothing items are tumbling about the drying chamber.

In addition, the smart device 200 can operate the various components of the dryer 100 to further the quality of the sales demo 240 by providing a component demonstration 326. The component demonstration 326 can comprise operation of one or more internal components of the dryer 100 in order to demonstrate dryer operation. For example, in conjunction with the light-related feature-specific voice clip 322 and video clips 324 discussed above, the smart device 200 could instruct a component responsible for operating the light in the dryer 100 to switch the light on and off.

If a customer presses the start button 160, the air flow demo unit 230 can be used to present an air flow demo unit demonstration 330. The blower assembly 140 will be operated by the smart device 200 to produce varying rates of air flow in order to demonstrate the dryer's 100 unique air flow feature. The air will flow out the exhaust and into the conduit 232 to cause the ball 234 to move upwardly and downwardly in the conduit 232. The other components of the dryer 100 that would operate during normal operation of the dryer 100 will not be operated, such as the heater assembly 144 and the motor assembly 133. The blower assembly 140 will produce varying air flow rates will cause the ball to hover near the top of the conduit 232, at a point just above the user interface 104 so that a customer can still see the ball 234, and at a point therebetween. As the ball 234 is moved about, an air flow voice clip 334 will be emitted via speakers 216 that will explain the benefits of varying the air flow. The LCD monitor 220 can also display a corresponding air flow video clip 336 of a graph depicting the improved drying ability of the dryer 100 as compared to competitor's dryers. Upon completion of the air flow demo unit demonstration 330, the introductory voice clip 320 can be output by the speakers 216 once again.

The smart device 200 can be disconnected 337 from the dryer 100 at any time to halt operation 338 of the sales demo 240.

Figure 14:
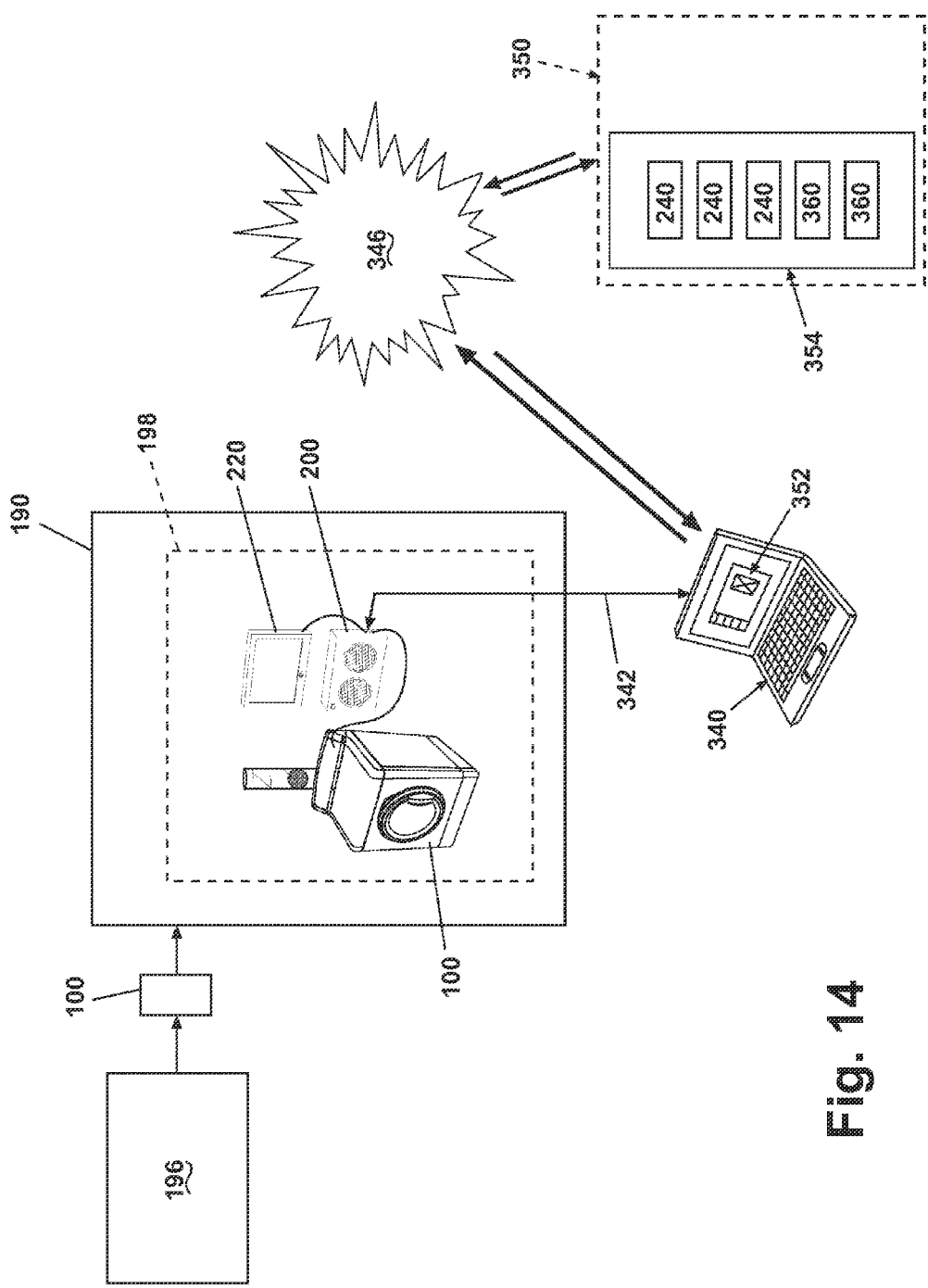
FIG. 14 is a schematic illustration of a business method for use with the invention of FIG. 12.

Looking now also at FIG. 14, a production unit of the dryer 100 having the capability to perform part or all of the aforementioned functions, depending upon model, is shipped by its manufacturer 196 to a vendor 198 for sale. Once at the vendor 198, the dryer 100 is put on display at a desired location where customers can walk about and view the dryer 100. The dryer 100 may be plugged into a power source, enabling it to be operated to the fullest extent of its capabilities, but more commonly, it will not be connected to a conventional power source. Here is where the invention is most useful.

Various sales demos 240 stored in the smart device 200 can be accessed and updated by connecting a computer 340 having a USB device 342 to USB port 210 of the smart device 200. Alternatively, the computer 340 can comprise a wireless device (not shown) and can be connected wirelessly to the smart device 200 via wireless port 212. This is simply a matter of preference and/or availability for each particular vendor 198 displaying the dryer 100. New sales demos 240 and sales demo updates 360 can also be downloaded via the computer 340. Existing sales demos 240 can be updated, modified, or deleted via the computer 340. The computer 340 comprises a connection to the internet 346 enabling access to a website 350. The website 350 is managed by either the manufacturer 196 or the vendor 198. The website 350 comprises a database 354 having a variety of sales demos 240 and/or sales demo updates 360 that can be downloaded to the smart device 200 using a specially-designed downloading program 352 installed on the computer 340. The downloading program 352 software can be downloaded from the website 350. The program 352 provides a simple interface or window serving to guide a user through the downloading process. The program 352 downloads the sales demos 240 to the smart device 200. The program 352 can also enable a user to modify certain characteristics of the sales demo 240. Modifiable characteristics can be designated within the sales demo 240 code.

Figure 15:
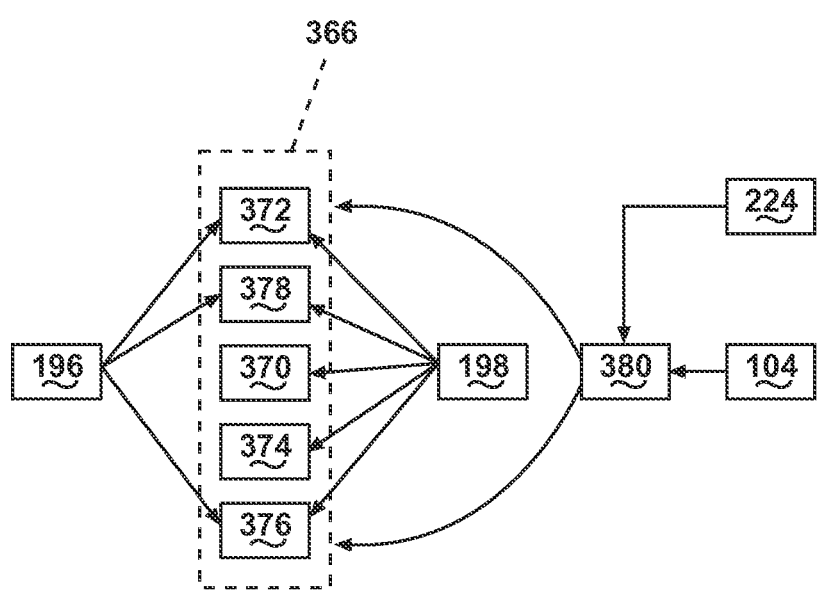
FIG. 15 is a flow chart illustrating the affect of various factors on business concepts for inclusion in the sales demo of FIG. 13.

The sales demos 240 can be downloaded to the smart device 200 and altered as previously described, which enables the vendor 198 to adapt the sales demos 240 to suit current business needs. Different sales demos 240 are available so as to enable vendors 198 to adapt the sales demos 240 for incorporation of a variety of business concepts 366 as shown in FIG. 15.

Business concepts 366 can include targeting regions 370, incorporating advertising campaigns 372, targeting demographics 374, reflecting marketing strategies 376, and/or including current promotions 378. The target region 370 and target demographic 374 are commonly designated by the vendor 198, as manufacturers 196 tend to supply appliances to numerous regions 370 and demographics 374. The advertising campaigns 372, marketing strategies 376, and current promotions 378 can be those of either the manufacturer 196 or the vendor 198. By differentiating the dryer 100 from other dryers on display at the vendor 198, the sales demos 240 can help improve sales of the dryer 100. The sales demos 240 can be customized according to the vendor 198 and trade partners of the manufacturer 196 of the dryer 100. Furthermore, by locating the sales demos 240 on the smart device 200, code for sales demos 240 that would traditionally reside on the dryer 100 can be removed from the dryer 100, thereby reducing development time and cost of the dryer 100. In addition, information gathered and stored by the smart camera 224 and the user interface 104 can be accessed by the manufacturer 196 and/or vendor 198 to generate customer profiles 380. Customer profiles 380 can then be used to generate advertising campaigns 372, marketing strategies 376, and the like.

It will be apparent from this disclosure that a manufacturer need only make production units of a product and offer them for sale through normal distribution channels. The invention provides a very flexible way to demonstrate the product by enabling a vendor to connect the smart device to a given production unit, install specific demonstration software on the smart device, and operate the smart device to assume control of the product in a demonstration mode. The sales demonstration can thus be targeted to a specific market, for example, geographically or demographically. The demonstration can be tailored to a specific vendor by simple software changes. It can be made fully interactive with a potential customer, and even tailored to the type of customer that the system might be configured to perceive.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

We claim:

1. A product demonstration system comprising:
    an appliance comprising:
        a plurality of components having corresponding functionalities;
        a communications network coupled to the plurality of the components; and
        a software architecture configured to generate a plurality messages on the communications network wherein the software architecture includes the first software operating layer configured to control operation of at least one of the plurality of components by way of a control logic in a first operational state to implement a predetermined cycle of operation performing a physical domestic operation on an article in response to the messages sent on the communication network, and a second software operating layer configured to control the operation of the at least one of the plurality of components in a second operational state in response to messages sent on the communications network, wherein the control logic by way of the first software operating layer is rendered ineffective unless invoked by way of the second software operating layer; and
    a smart device external to the appliance, coupled to the communications network, and having memory in which resides demonstration software configured to communicate with the software architecture to enable and instruct the second software operating layer to implement a demonstration mode, directly operating at least one of the plurality of components to demonstrate the corresponding functionality independent of implementing or demonstrating the predetermined cycle of operation and without performing the physical domestic operation on the article.

2. The product demonstration system of claim 1 wherein the appliance is a household appliance selected from the group consisting of: a clothes washing machine, a clothes dryer, an oven, a dishwasher, a refrigerator, a freezer, a microwave oven, a trash compactor and a countertop appliance.

3. The product demonstration system of claim 2 wherein at least one interactive device is connected to one of the household appliance or the smart device.

4. The product demonstration system of claim 3 wherein the at least one interactive device is selected from a group comprising a proximity sensor, an LCD display, a speaker, a computer, a touch screen, a keyboard, a monitor, a mechanical device, a light display, a microphone, a camera, and a phone.

5. The product demonstration system of claim 3 wherein the at least one interactive device is connected to the smart device.

6. The product demonstration system of claim 5 wherein the at least one interactive device is selected from a group comprising a proximity sensor, an LCD display, a speaker, a computer, a touch screen, a keyboard, a monitor, a mechanical device, a light display, a microphone, a camera, and a phone.

7. The product demonstration system of claim 2 wherein the smart device has a communication link to an external network whereby the demonstration software can be changed by way of the external network.

8. The product demonstration system of claim 2 wherein the smart device has a communication link to an external memory device from which to change the demonstration software.

9. The product demonstration system of claim 1 wherein the appliance can receive a plurality of inputs that result in an implementation of the predetermined cycle of operation when the appliance is operated without the smart device, but that when the smart device is in communication with the communications network, execution of the demonstration software in the appliance will cause demonstration of a functionality of the appliance without affecting the predetermined cycle of operation.

10. The product demonstration system of claim 9 wherein the predetermined cycle of operation is a first ordered collection of steps that operate on the article and the demonstration of the functionality of the appliance is a second ordered collection of steps, different from the first ordered collection of steps and that does not operate on the article.

11. The product demonstration system of claim 9 wherein the appliance is a clothes dryer, the plurality of inputs results in the predetermined cycle of operation of the appliance to implement a drying cycle, and the demonstration of the functionality of the appliance is an audio explanation of the drying cycle via at least one speaker.

12. The product demonstration system of claim 9 wherein at least one interactive device is connected to one of the appliance or the smart device.

13. The product demonstration system of claim 12 wherein the at least one interactive device is selected from a group comprising a proximity sensor, an LCD display, a speaker, a computer, a touch screen, a keyboard, a monitor, a mechanical device, a light display, a microphone, a camera, and a phone.

14. The product demonstration system of claim 12 wherein the at least one interactive device is connected to the smart device.

15. The product demonstration system of claim 14 wherein the at least one interactive device is selected from a group comprising a proximity sensor, an LCD display, a speaker, a computer, a touch screen, a keyboard, a monitor, a mechanical device, a light display, a microphone, a camera, and a phone.

16. The product demonstration system of claim 9 wherein the smart device has a communication link to an external network whereby the demonstration software can be changed by way of the external network.

17. The product demonstration system of claim 9 wherein the smart device has a communication link to an external memory device from which to change the demonstration software.

* * * * *